June 13, 1933.  B. F. COURT  1,914,195
OIL RECTIFIER FOR ENGINES
Filed June 21, 1932
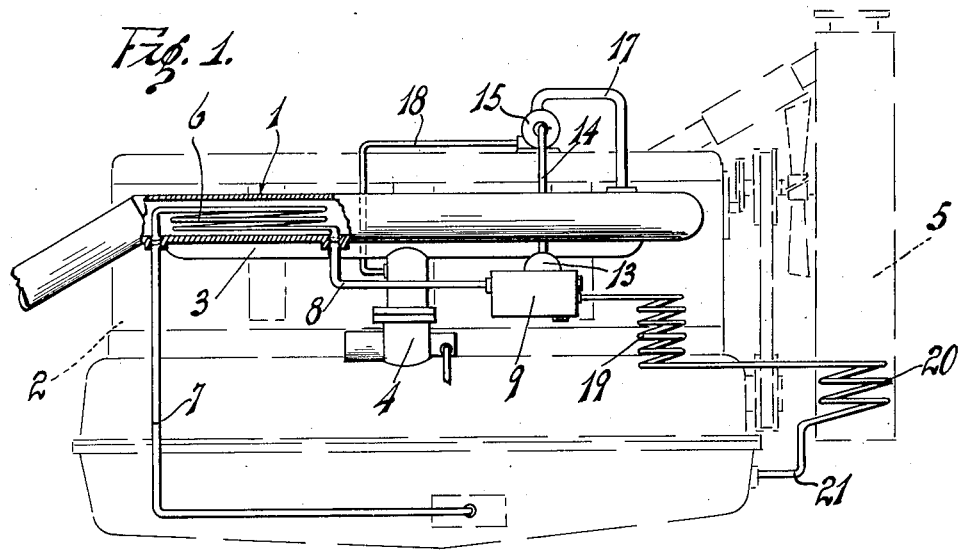
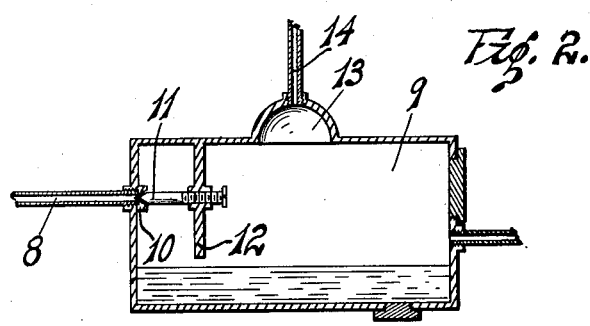
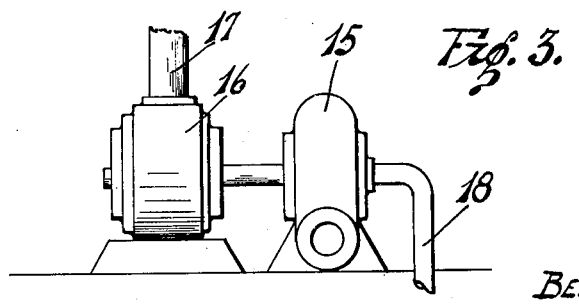
INVENTOR.
BENJAMIN F. COURT.
BY.
ATTORNEY.

Patented June 13, 1933

1,914,195

UNITED STATES PATENT OFFICE

BENJAMIN F. COURT, OF LONG BEACH, CALIFORNIA

OIL RECTIFIER FOR ENGINES

Application filed June 21, 1932. Serial No. 618,412.

This invention relates to an oil rectifier for engines by means of which various non-lubricating liquids are removed from the oil.

An object of my invention is to provide a novel oil rectifier which effectively removes gasoline, water and the like from oil, by first heating the oil, then removing the non-lubricating liquids, and then cooling the oil before it is returned to the engine.

Another object is to provide a novel means for removing the gasoline, water and the like from the oil and returning such liquids to the intake manifold of the engine.

Still another object is to provide a novel means of spraying the oil after it is heated so that the gasoline, water and the like can be more effectively removed therefrom.

Other objects, advantages and features of invention may appear from the accompanying drawing, the subjoined detailed description and the appended claims.

In the drawing

Figure 1 is a side elevation of my apparatus in position on an engine.

Figure 2 is a transverse, sectional view of the separating chamber.

Figure 3 is an end view of the pump and the turbine drive.

Referring more particularly to the drawing, the numeral 1 indicates the exhaust manifold of the engine 2. The numeral 3 indicates the intake manifold to which the usual carburetor 4 is attached. A cooling radiator 5, of usual and well known design, is provided for the engine, and the specific purpose thereof will be further described.

A coil pipe 6 is positioned in the exhaust manifold and oil is supplied to the coil by a pipe 7. Oil is pumped into the pipe 7 from the crank case of the engine by the usual oil pump. The pipe 7 being a by-pass so that only a portion of the oil passes therethrough. The oil is heated in the coil 6 by the hot exhaust gases, and said oil then passes into a pipe 8 which extends to a separating chamber 9. The hot oil is sprayed into the chamber 9 through a nozzle 10. The opening in said nozzle being controlled by an adjustable screw 11. The screw is threaded through a baffle plate 12 in the chamber 9. The oil is thus broken up into small particles so that the gas therein is liberated.

A collecting dome 13 in the top of the chamber provides a means for the accumulation of the vaporized gasoline, water and et cetera in the oil. A draw-off pipe 14 extends from the top of the dome 13 to a pump 15. The pump is preferably driven by a small turbine 16, which is driven by the exhaust gases. Said gases being sent to the turbine through the pipe 17. The gasoline vapors are returned to the intake manifold through a pipe 18, which preferably extends into said manifold above the usual butterfly controlled valve.

The cleaned oil from the chamber 9 passes into a cooling coil 19, thence into a coil 20 in the bottom of the radiator 5, and then returns to the engine through the return tube 21. The oil is effectively cooled before returning to the crank case, so that its viscosity is not materially altered. The pump 15 provides a constant suction on the chamber 9 so that all of the vapors are removed from the oil, and none are condensed and return to the crank case.

Having described my invention, I claim:

1. An engine including an exhaust manifold, an intake manifold, and a crank case, an oil rectifier comprising a pipe coil in the exhaust manifold, a supply pipe extending to the coil from the crank case, a separating chamber, a pipe extending from the coil to the separating chamber, suction means coupled to the separating chamber whereby vapors are withdrawn from said chamber, a cooling coil, and a return pipe extending from the cooling coil to the crank case.

2. An engine including an exhaust manifold, an intake manifold, and a crank case, an oil rectifier comprising a pipe coil in the exhaust manifold, a supply pipe extending to the coil from the crank case, a separating chamber, a spray nozzle in the separating chamber, said last named pipe being attached to the spray nozzle, suction means connected to said separating chamber, an oil cooling coil connected to said separating chamber, and a return pipe extending from the cooling coil to the crank case.

3. An engine including an exhaust manifold, an intake manifold and a crank case, an oil rectifier comprising a pipe coil in the exhaust manifold, a supply pipe extending to the coil from the crank case, a separating chamber, a spray nozzle in the separating chamber, and means to adjust said spray nozzle, said last named pipe being attached to the spray nozzle, suction means connected to said separating chamber, an oil cooling coil connected to said separating chamber, and a return pipe extending from the cooling coil to the crank case.

4. An engine including an exhaust manifold, an intake manifold, and a crank case, an oil rectifier comprising a pipe coil in the exhaust manifold, a supply pipe extending to the coil from the crank case, a separating chamber, a pipe extending from the coil to the separating chamber, a spray nozzle in said separating chamber, said last named pipe being connected to the spray nozzle, a baffle plate in the separating chamber, a screw extending through the baffle plate and into the spray nozzle whereby the spray nozzle is adjusted, a suction pump connected to the top of said separating chamber, drive means for said suction pump, an oil cooling coil connected to the separating chamber, and a return pipe extending from the cooling coil to the crank case.

5. An engine including an exhaust manifold, an intake manifold and a crank case, an oil rectifier comprising a pipe coil in the exhaust manifold, a supply pipe extending to the coil from the crank case, a separating chamber, a pipe extending from the coil to the separating chamber, a spray nozzle in said separating chamber, said last named pipe being connected to the spray nozzle, a baffle plate in the separating chamber, a screw extending through the baffle plate and into the spray nozzle whereby the spray nozzle is adjusted, drive means for said suction pump, an oil cooling coil connected to the separating chamber, and a return pipe extending from the cooling coil to the crank case, a vapor return pipe extending from the pump to the intake manifold, and a second cooling coil in the radiator, said second cooling coil being connected to the first named cooling coil.

In testimony whereof, I affix my signature.

BENJAMIN F. COURT.